United States Patent
Hirata et al.

(10) Patent No.: US 7,342,724 B2
(45) Date of Patent: Mar. 11, 2008

(54) REAR PROJECTION TYPE IMAGE DISPLAY DEVICE

(75) Inventors: Koji Hirata, Yokohama (JP); Shuji Kato, Yokohama (JP); Hidehiro Ikeda, Yokohama (JP); Masahiro Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/705,070

(22) Filed: Feb. 12, 2007

(65) Prior Publication Data
US 2007/0139622 A1 Jun. 21, 2007

Related U.S. Application Data

(63) Continuation of application No. 10/922,225, filed on Aug. 20, 2004, now Pat. No. 7,244,030.

(30) Foreign Application Priority Data
Nov. 28, 2003 (JP) .............................. 2003-398394

(51) Int. Cl.
*G02B 3/00* (2006.01)
*G03B 21/26* (2006.01)

(52) U.S. Cl. ........................ 359/649; 353/30
(58) Field of Classification Search ........ 359/649–675; 353/30–37, 69, 70
See application file for complete search history.

(56) References Cited

U.S. PATENT DOCUMENTS

| 4,003,080 A | 1/1977 | Maiman et al. |
| 5,278,595 A | 1/1994 | Nishida et al. |
| 5,371,559 A * | 12/1994 | San-Nohe et al. ............. 353/31 |
| 5,467,154 A | 11/1995 | Gale et al. |
| 5,539,579 A * | 7/1996 | Miyatake et al. ........... 359/634 |
| 5,826,961 A | 10/1998 | Kim et al. |
| 6,233,024 B1 | 5/2001 | Hiller et al. |

(Continued)

FOREIGN PATENT DOCUMENTS

| EP | 0 240 045 | 10/1987 |
| EP | 0 952 474 A3 | 10/1999 |
| JP | 5-134213 | 5/1993 |
| JP | 10-260474 | 9/1998 |
| JP | 2000-162544 | 6/2000 |

(Continued)

OTHER PUBLICATIONS

Chinese Office Action with English translation issued in corresponding Chinese Patent Application No. 2004-100570726, dated Nov. 17, 2006.

*Primary Examiner*—M. Hasan
(74) *Attorney, Agent, or Firm*—McDermott Will & Emery LLP

(57) ABSTRACT

The present invention relates to a rear projection type image display device comprising projection lenses (2, 3) for projecting an image displayed on an image display element onto a transmission type screen (6) on a larger scale, an optical path turn-back mirror (7) for turning back halfway a light beam projected from the projection lenses, and a drive circuit for displaying an image on the image display element, that are fixedly housed within a housing (5). When a diagonal size of the transmission type screen (6), the depth of the housing (5), and the length from a lower end of the screen (6) to a lower end of the housing (5), are assumed to be SS (inch), D (inch), and L (inch), respectively, the following conditions are satisfied:

$SS>40, D \leq SS/3.0, L \leq SS/10.9.$

3 Claims, 16 Drawing Sheets

U.S. PATENT DOCUMENTS

| | | |
|---|---|---|
| 6,457,834 B1 | 10/2002 | Cotton et al. |
| 6,473,236 B2 | 10/2002 | Tadic-Galeb et al. |
| 6,473,244 B1 | 10/2002 | Sugano |
| 6,476,981 B1 | 11/2002 | Shikama |
| 6,560,031 B1 | 5/2003 | Shafer et al. |
| 6,577,455 B2 | 6/2003 | Shikama |
| 6,761,458 B2 | 7/2004 | Sakata et al. |
| 2002/0044263 A1 | 4/2002 | Takeuchi |

FOREIGN PATENT DOCUMENTS

| | | |
|---|---|---|
| JP | 2002-207190 | 7/2002 |
| JP | 2002-357768 | 12/2002 |
| WO | WO 02/079826 | 10/2002 |

* cited by examiner

FIG. 11

| SURFACE | RADIUS OF CURVATURE (mm) | INTERSURFACE DISTANCE (mm) | GLASS MATERIAL |
|---|---|---|---|
| Sa0 | INFINITY | 2.5 | '1737' |
| Sa1 | INFINITY | 1 | AIR |
| Sa2 | INFINITY | 0.7 | 'B270' |
| Sa3 | INFINITY | 10 | 'GE55' |
| Sa4 | INFINITY | 1.555 | 'B270' |
| Sa5 | INFINITY | 14 | 'GE55' |
| Sa6 | INFINITY | 24 | BACD18 HOYA |
| Sa7 | INFINITY | 2.23 | AIR |
| Sa8 | 46.231 | 5.798 | LAC10 HOYA |
| Sa9 | -50.5259 | 0.268 | AIR |
| Sa10 | 22.5761 | 5.129 | LAC14 HOYA |
| Sa11 | 64.5372 | 4.126 | AIR |
| Sa12 | -72.2431 | 4.415 | FD60 HOYA |
| Sa13 | 16.682 | 3.278 | AIR |
| Sa14 | INFINITY | 4.616 | AIR |
| Sa15 | -11.0588 | 2.007 | DF60 HOYA |
| Sa16 | -28.6349 | 4.46 | LAC10 HOYA |
| Sa17 | -15.719 | 0.268 | AIR |
| Sa18 | 508.848 | 4.795 | NBFD3 HOYA |
| Sa19 | -31.462 | 157.417 | AIR |
| Sa20 | 82.8636 | 13.5 | TAC8 HOYA |
| Sa21 | INFINITY | 4.495 | AIR |

FIG. 15

| SURFACE | RADIUS OF CURVATURE (mm) | INTERSURFACE DISTANCE (mm) | GLASS MATERIAL |
|---|---|---|---|
| Sb0 | INFINITY | 27.727 | AIR |
| Sb1 | 22176.9 | 9.5 | 'PMMA25' |
| Sb2 | -57.1031 | 0.5 | AIR |
| Sb3 | 163.807 | 2.5 | FDS90 HOYA |
| Sb4 | 34.3457 | 17.275 | FC5 HOYA |
| Sb5 | -679.685 | 0.5 | AIR |
| Sb6 | 48.347 | 14 | BACD5 HOYA |
| Sb7 | -183.155 | 0.65 | AIR |
| Sb8 | 27.8409 | 7.464 | BSC7 HOYA |
| Sb9 | 20.8326 | 8.840 | AIR |
| Sb10 | 26.7083 | 13.516 | BSC7 HOYA |
| Sb11 | -364.105 | 9.121 | AIR |
| Sb12 | INFINITY | 6.272 | AIR |
| Sb13 | 31.1946 | 3 | BSC7 HOYA |
| Sb14 | 32.3414 | 9.716 | AIR |
| Sb15 | -21.6645 | 2 | 'PMMA25' |
| Sb16 | -70.9357 | 14.439 | AIR |
| Sb17 | -29 | 3.5 | BSC7 HOYA |
| Sb18 | -41.1679 | 14.116 | AIR |
| Sb19 | -20.1366 | 10 | 'PMMA25' |
| Sb20 | -37.2281 | 425 | AIR |

| SURFACE | CONE CONSTANT CC | AE | AF | AG | AH | AI |
|---|---|---|---|---|---|---|
| Sb1 | -3.10E+28 | -4.93E-06 | -7.65E-09 | 1.81E-11 | -6.80E-15 | -1.96E-18 |
| Sb2 | -1.18626412 | -5.75E-07 | -6.82E-09 | 1.20E-11 | -3.00E-15 | -2.09E-18 |
| Sb15 | 1.084670938 | -6.16E-06 | 9.58E-08 | -1.22E-09 | 7.06E-12 | -1.84E-14 |
| Sb16 | 5.904507011 | 5.02E-06 | -5.05E-09 | 1.54E-11 | -5.09E-14 | 7.14E-17 |
| Sb19 | -2.085899912 | 8.64E-07 | -2.27E-10 | 8.16E-14 | -1.48E-17 | 6.45E-22 |
| Sb20 | -5.931655051 | -7.88E-07 | 4.57E-11 | -2.09E-13 | 6.55E-17 | -1.29E-20 |

$$Z = \frac{r^2/RD}{1+SQR(1-(1+CC)r^2/RD^2)} + AE \cdot r^4 + AF \cdot r^6 + AG \cdot r^8 + AH \cdot r^{10} + AI \cdot r^{12}$$

REAR PROJECTION TYPE IMAGE DISPLAY DEVICE

CLAIM OF PRIORITY

The present application is a continuation of U.S. patent application No. 10/922,225, filed on Aug. 20, 2004 now U.S. Pat. No. 7,244,030, which claims priority from Japanese application serial No. JP2003-398394, filed on Nov. 28, 2003, the content of which are hereby incorporated by reference into this application.

BACKGROUND OF THE INVENTION

The present invention relates to a rear projection type image display device of a construction wherein an image on an image display element is projected on a larger scale onto a transmission type screen by means of a projection optical unit including projection lenses.

Heretofore, in connection with a rear projection type image display device (hereinafter referred to as "set" as necessary) using a pixel selection type element such as, for example, a liquid crystal panel as an image display element for image display, studies have been made for decreasing the height and depth (making the set compact) by a method different from a set using a CRT as an image display element. For example, a rear projection type image display device using a projection optical unit for projecting an image on a larger scale onto a transmission type screen obliquely is disclosed in Japanese Patent Laid-open Nos. 5-134213 (Literature 1), 2000-162544 (Literature 2) and 2002-357768 (Literature 3).

SUMMARY OF THE INVENTION

If an image is projected onto a screen obliquely using a projection optical unit as in the above conventional techniques, the so-called trapezoidal distortion occurs in the image projected onto the screen. According to a solution adopted by a projection optical system proposed in the above Literature 1, an a focal converter disposed on the screen side is off-centered to prevent the trapezoidal distortion. However, according to the afocal converter disclosed in the literature, it is difficult to attain a wide-angle structure of the set (a compact structure of the set) because of a low magnification. According to a projection system proposed in the above Literature 2, it is difficult to attain such a degree of a wide-angle structure as permits a sufficient reduction in thickness of the rear projection type image display device. In addition, it is necessary that lenses used be off-centered each individually, so that the device is difficult to manufacture. A projection optical system proposed in the above Literature 3 comprises a first refracting lens system having positive power, a second refracting optical system having negative power, and an optical path turn-back mirror. At least two lenses included in the second refracting lens system having negative power are off-centered and different from each other in rotational symmetry, thus it is difficult to ensure a high degree of positional accuracy of each lens during manufacture.

In addition, the layout design in the set of the above conventional techniques disclosed in the Literatures 1 to 3, i.e., the layout design of various components, including the projection optical system, arranged in the interior of a housing of the set, takes note of only the projection optical system including projection lenses. An optimum set design taking into account the entire system including ensuring a drive circuit installing place within the housing has not been made.

Therefore, in order to make the set compact, it is necessary to provide a housing structure (including layout of various components) suitable thereto and a projection optical system having a wide field angle for attaining a compact structure, high focus, a high magnification and long back focus.

The present invention has been accomplished in view of the above-mentioned circumstances and it is an object of the invention to provide a technique suitable for making the set compact in a rear projection type image display device.

To achieve the above-mentioned object, a rear projection type image display device according to the present invention includes an image display element for displaying an image, projection lenses for projecting the image displayed on the image display element onto a transmission type screen on a larger scale, and a turn-back mirror disposed in an optical path from the projection lenses to the transmission type screen to reflect a light beam projected from the projection lenses and direct it to the transmission type screen, which are housed in the interior of a housing. In addition, this image display device is characterized in that when a diagonal size of the transmission type screen, the depth of the housing, and the length from a lower end of the screen to a lower end of the housing, are assumed to be SS (inch), D (inch), and L (inch), respectively, the following conditions are satisfied:

$SS>40$ $D \leq SS/3.0$ $L \leq SS/10.9$

A central height H (inch) of the transmission type screen satisfies the condition of $H \leq SS/2.9$. Further, the projection lenses satisfy the condition of $LL<SS/2.7$ when the distance from the lens disposed at a position closest to the transmission type screen up to the same screen is assumed to be LL (inch).

The projection lenses used in the projection type image display device of the present invention comprise two or more lens groups having positive refracting power and arranged in an optical path from the image display element to the screen. For example, in the case of a projection lens unit having two lens groups, a first enlarged image formed by a first lens group disposed closest to the image display element is once formed on the image display element side with respect to a second lens group. The first enlarged image is projected on a larger scale onto the screen by the second lens group. A field lens group having positive refracting power is disposed between the first and the second lens group. The magnification M1 of the first enlarged image is set to a level smaller than the magnification M2 of a second enlarged image which is formed on the screen by the second lens group.

It is preferable that the first lens group be designed in conformity with the F value of a telecentric illumination optical system on the image display element side. Since the first enlarged image formed by the first lens group is formed on the image display element side with respect to the second lens group, the value of F2 (divergence angle of light rays) as the F value of the second lens group becomes a value obtained by dividing the value of F1 as the F value of the first lens group by the magnification M1 of the first enlarged image, i.e., F2=F1/M1. Thus, since F2 of the second lens group can be taken large, this design is advantageous to an ultra-wide angle structure of the set exceeding 90 degrees in field angle.

A further compact structure of the projection type image display device itself can be attained by arranging the first lens group substantially in parallel with the horizontal direction of a picture plane of the screen, the first lens group being positioned closest to the image display element, disposing optical path turn-back element (reflector) between the first and the second lens group, disposing the second lens group substantially perpendicularly to the horizontal direction of the picture plane of the screen and obtaining an enlarged image on the screen through a turn-back mirror. Thus, the present invention can provide a compact projection type image display device.

BRIEF DESCRIPTION OF THE DRAWINGS

FIG. 11 is a diagram showing lens data of a first lens group used in a first example of a projection optical system according to the present invention;

FIG. 15 is a diagram showing lens data of the second lens group in the first example of the projection optical system;

DETAILED DESCRIPTION OF THE PREFERRED EMBODIMENTS

Figure 1:
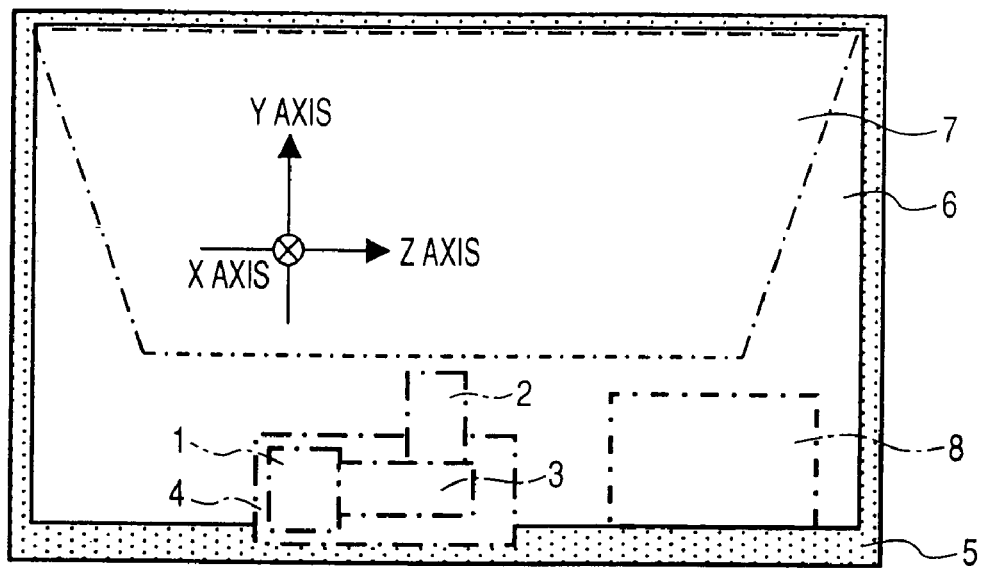
FIG. 1 is a front view of a rear projection type image display device embodying the present invention.

A projection type image display device and a rear projection type image display device both using a projection optical unit according to the present invention will be described below with reference to the accompanying drawings. In the drawings, portions having common functions are identified by the same reference numerals, and with respect to portions once explained, repeated explanations thereof will be omitted to avoid complexity.

Figure 2:
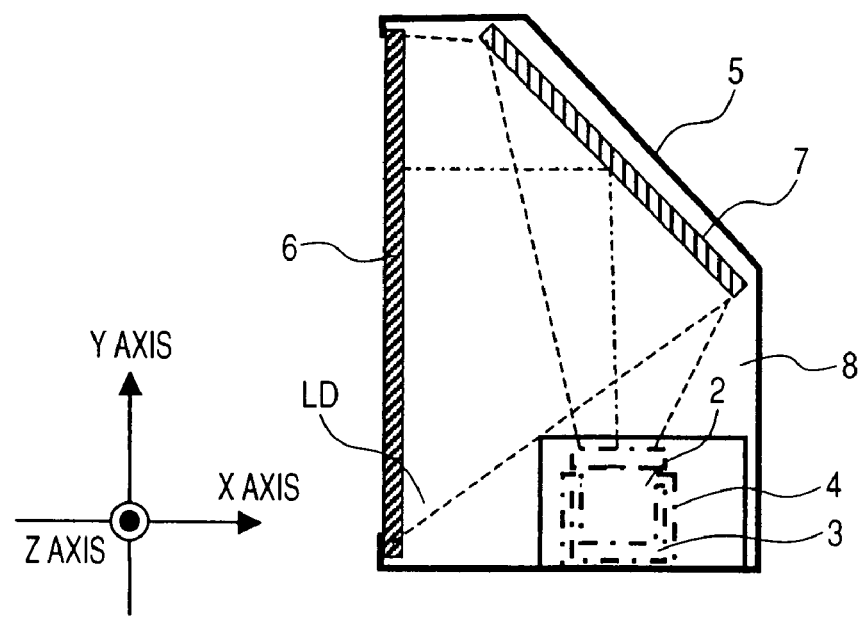
FIG. 2 is a side view thereof.

FIG. 1 is a front view of a rear projection type image display unit using a projection optical unit according to an embodiment of the present invention and FIG. 2 is a side view thereof. A transmission type screen 6 is disposed on an image-viewing side of, i.e., in front of a housing 5 which defines a contour of the set. An image display element such as a liquid crystal panel (not shown), an illumination optical system 1, an optical path turn-back mirror 7, a projection optical unit 4, and a chassis 8, are housed within the housing 5 and are fixed at predetermined positions. The projection optical unit 4 irradiates the image display element with light from a white light source through the illumination optical system and projects on a larger scale an image which has been formed in accordance with a video signal by the image display element. The chassis 8 includes a signal circuit or a power supply circuit as a drive circuit for driving the image display element. The projection optical unit 4 includes a first lens barrel 3 which incorporates a first lens group (not shown, to be described later) having positive refracting power and a second lens barrel 2 which incorporates a second lens group (not shown, to be described later) having positive refracting power of the projection optical unit. The optical unit 4 is disposed on the left side with respect to the screen center of the set and the chassis 8 is installed in the resulting right-hand space to constitute the rear projection type image display device.

The optical unit 4 is disposed in a lower portion of the housing 5 as shown in FIG. 2, and image light projected from the optical unit 4 is turned back by the optical path turn-back mirror 7 and is projected to the screen 6 from the rear side of the screen 6.

The projection optical unit according to the present invention includes a first lens group (to be described later, not shown) installed within the first lens barrel 3 so that an optical axis thereof is substantially parallel to the horizontal direction of the picture plane of the screen 6 and a second lens group (not shown, to be described later) in stalled within the second lens barrel 2 so that an optical axis thereof is substantially orthogonal to the optical axis of the first lens group. In the connection between the first and the second lens group there is disposed optical path turn-back means (not shown, to be described later) such as, for example, a mirror for turning back the optical path so as to direct image light from the first lens group to the second lens group.

Thus, the projection optical unit according to the present invention is divided into at least two lens groups, which are arranged so that their optical axes are substantially orthogonal to each other. The optical axis of the first lens group extends so as to be substantially parallel to the horizontal direction of the picture plane of the screen 6. Consequently, the depth of the rear projection type image display device can be reduced and the height of the projection optical unit can be reduced. This is effective in attaining a compact structure of the entire set. A light source lamp for horizontal lighting is used as a light source. When this light source lamp is disposed substantially in parallel with the horizontal direction of the picture plane of the screen, this arrangement is effective particularly in attaining a compact structure and provides a long service life.

To facilitate the following explanation, orthogonal coordinates of the right-hand system are here adopted. In FIG. 1 it is assumed that the screen 6 is parallel to the YZ plane, the horizontal (lateral) direction of the screen 6 is Z-axis direction, and the vertical direction of the screen is Y-axis direction. The direction piercing through the screen 6 from the surface side (viewer's side) to the back side is X-axis direction.

In FIG. 2, as noted earlier, the first lens group (not shown) installed within the first lens barrel 3 and the second lens group (not shown) installed within the second lens barrel 2 are arranged in such a manner that an optical axis $3_1$ (parallel to Z axis in the same figure, hereinafter referred to as the "optical axis of the first lens barrel") of the first lens group and an optical axis $2_1$ (the "optical axis of the second lens barrel" hereinafter) of the second lens group intersect each other substantially perpendicularly by the optical path turn-back element (not shown) installed in the projection optical unit. The optical axis $2_1$ of the second lens barrel 2 is shifted rightwards substantially in the X-axis direction with respect to the optical axis $3_1$ of the first lens barrel 3, whereby the optical axis of the projection optical unit is shifted with respect to the screen 6, so that the angle becomes larger which is formed between the X axis and a light ray LD traveling from the optical path turn-back mirror 7 toward a lower end of the screen 6. Thus, the position of the optical unit 4 can be raised in the Y-axis direction, i.e., vertically upwards relative to the screen accordingly, and the second lens barrel can be disposed at a higher position than the lower end of the screen 6 vertically upwards relative to the screen. According to such a construction it is possible to provide a compact set wherein the distance from the lower end of the screen to the bottom of the housing is short.

Figure 5:
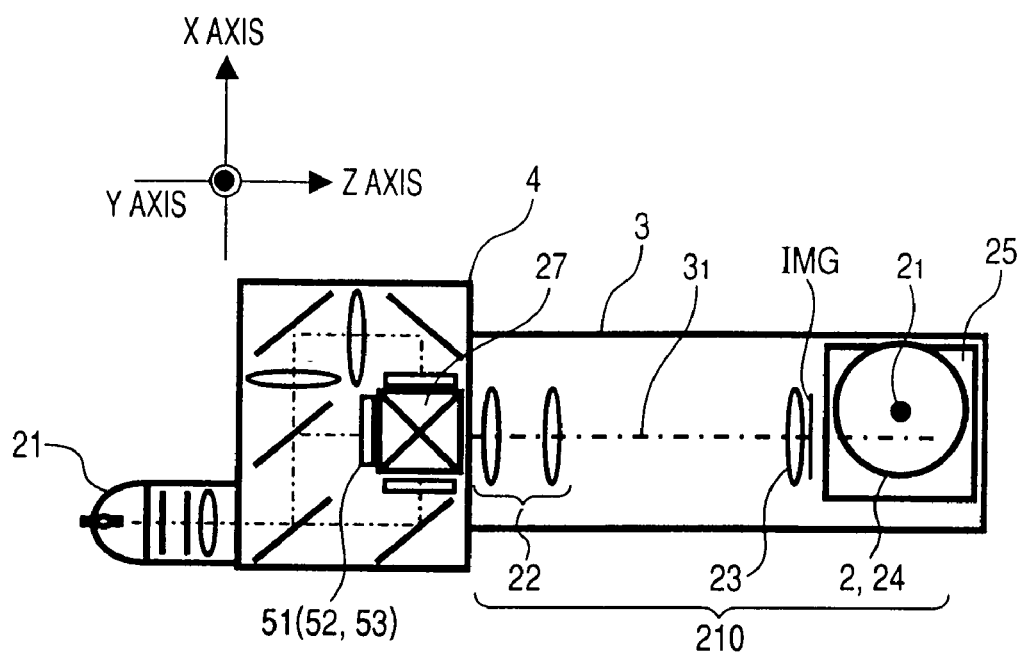
FIG. 5 is a layout diagram showing a first example of an illumination optical system used in the rear projection type image display device.

Next, a description will now be made, with reference to FIG. 5, of a detailed construction of the projection optical unit in the rear projection type image display device embodying the present invention. For the convenience of explanation, components having the same functions as in FIG. 1 are identified by the same reference numerals as in FIG. 1. In FIG. 5, numeral 21 denotes a white lamp as a light source and numeral 4 denotes an optical unit used in a case of using a transmission type liquid crystal panel 51 (52, 53) as an image display element. Light emitted from the white lamp 21 is polarized and split by an illumination optical system (not shown) and is applied to the transmission type liquid crystal panel 51 (52, 53). Each color light incident on the transmission type liquid crystal panel 51 (52, 53) is modulated in light intensity in accordance with a video signal. The resulting optical images of color light beams are synthesized in crossed prisms 27 into a color image, which is enlarged in a projection optical unit 210.

The projection optical unit 210 comprises a first lens group 22 having positive refracting power and a field lens 23 both installed within the first lens barrel 3 and a second lens group 24 having positive refracting power and installed within the second lens barrel 2. An optical path turning-back means 25 is disposed in the connection between the first lens barrel 3 and the second lens barrel 2. The optical path turn-back means 25 is operative to turn back image light from the first lens group 22 and that from the field lens 23 to the second lens group 24. Numerals $3_1$ and $2_1$ denote optical axes of the first lens barrel 3 and the second lens barrel 2, respectively. Although in FIG. 5 the field lens 23 is shown as a single lens, it may be a group of a plurality of lenses.

In the present invention, the image synthesized by the crossed prisms 27 is once formed as an enlarged image (inverted image, an example thereof is indicated at IMG in FIG. 5) in the vicinity of the field lens 23 by the first lens group 22. The first and second lens barrels 3, 2 are arranged such that the optical axis $2_1$ of the second lens barrel 2 is made substantially perpendicular to the optical axis $3_1$ of the first lens barrel 3 by the optical path turn-back means. Further, the optical axis $2_1$ of the second lens barrel 2 is shifted substantially in the positive direction of X axis (rightwards in FIG. 2) for example.

Since the F value of the illumination optical system is approximately in the range from 2.0 to 3.0, it is necessary that the F value of the first lens group 22 be also be set to about the same value to introduce a light beam efficiently. If an effective screen size of the transmission type liquid crystal panel is set at 0.7 inch and the magnification M1 by the first lens group is 3×, the enlarged image near the field lens 23 becomes 2.1 inches. When the object (the enlarged image (IMG in the figure) by the first lens group 22) is seen from the second lens group 24 at this time, the angle of incidence of the light beam is in inverse proportion to the magnification M, so that the F value of the second lens group 24 becomes about 9.0 theoretically. Therefore, the field angle of the second lens group 24 can be designed to be an ultra-wide angle. If the diagonal screen size is set at 50 inches, the magnification M2 of the second lens group 24 becomes about 24×. That is, the magnification M1 of the first lens group 22 becomes smaller than the magnification M2 of the second lens group 24.

Since the projection type optical unit 210 according to the present invention includes the first and second lens groups having positive refracting power, the image synthesized by the crossed prisms 27 is formed as an inverted image (first enlarged image) in the vicinity of the field lens 23 by the first lens group 22. This inverted image is projected as an erected image (second enlarged image) onto the screen by the second lens group. Although in conventional projection type color image display devices the image projected onto the screen is inverted in comparison with the image on the image display element, the present invention is characterized in that the image projected onto the screen is an erected image.

In the rear projection type image display device according to the present invention shown in FIG. 1, it is preferable for the transmission type liquid crystal panel as an image display element to be disposed such that the horizontal direction of its picture plane lies on XY plane with respect to the image synthesizing crossed prisms 27. This is because the size of the crossed prisms 27 is determined by the size in a shorter direction in the aspect ratio of the picture plane and hence it is possible to shorten the back focus of the projection lenses. Thus, the size of the crossed prisms can be reduced and this is advantageous to the reduction of cost. Moreover, the light source lamp 21 and the second lens group 24 can be arranged nearly perpendicularly to each other in optical axis. Therefore, according to the rear projection type image display device embodying the present invention, as shown in FIG. 1 or FIG. 2, the light source lamp for horizontal lighting can be disposed substantially in parallel with the horizontal direction of the screen. Thus, even if the elevation angle of the rear projection type image display device changes on XY plane, the layout in the interior of the set can be determined without affecting the service life of the lamp. Further, since the rear projection type image display device can be disposed on one side in the horizontal direction of the screen (on one side with respect to the center of the screen) in the interior of the set, a power supply and a chassis such as a signal substrate can be disposed all together in an empty space on the other side and thus it is possible to provide a compact set.

Figure 6:
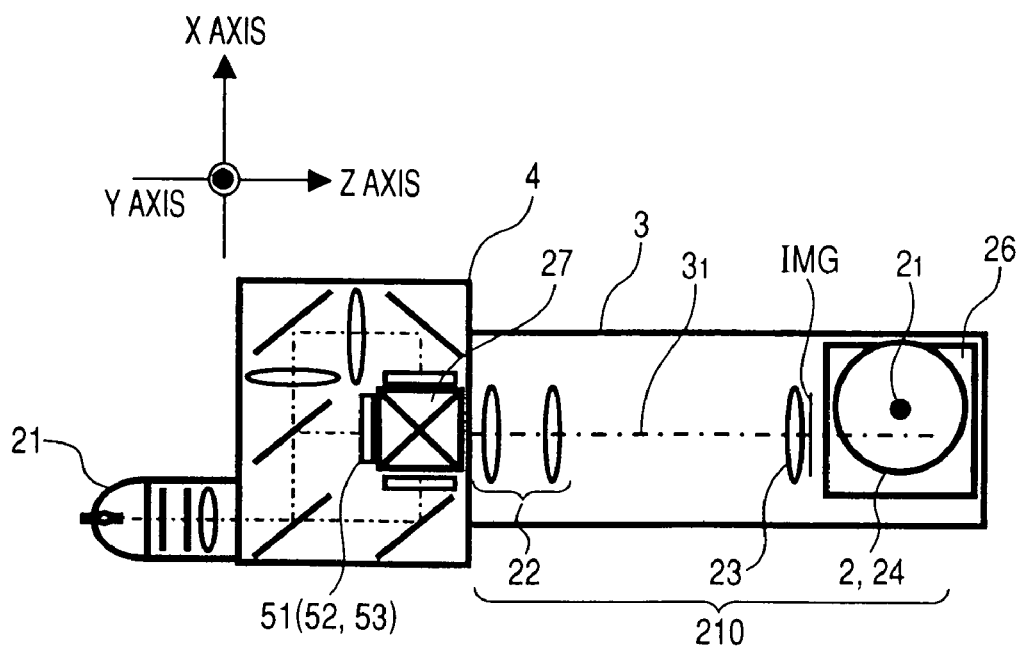
FIG. 6 is a layout diagram showing a second example of an illumination optical system used in the rear projection type image display device.

FIG. 6 shows an example of using a total reflection mirror as optical path turn-back means 26 disposed between the first and the second lens group. In the same figure, components having the same functions as those shown in FIG. 5 are identified by the same reference numerals as in FIG. 5, and explanations thereof will be omitted because they are the same as in FIG. 5.

In the rear projection type image display devices shown in FIGS. 5 and 6, the optical axis 21 of the second lens barrel 2 is shifted substantially in the positive direction of X axis (rightwards in FIG. 2) on XZ plane for example relative to the optical axis $3_1$ of the first lens barrel 3. Thus, it is possible to provide a compact set wherein the distance from the lower end of the screen to the bottom shown in FIG. 2 is short.

For example, moreover, by shifting the optical axis $2_1$ of the second lens barrel 2 in the Z-axis direction on XZ plane relative to the optical axis $3_1$ of the first lens barrel 3, it becomes no longer necessary to dispose the second lens group 24 at the center of the screen. As a result, the degree of layout freedom in the interior of the set increases and so it is possible to provide a compact set.

On the other hand, even if the effective picture plane size of the transmission type liquid crystal panel changes, the liquid crystal panel is applicable as it is to the same form of a set by only modifying the illumination optical system and the first lens group. Therefore, it is possible to provide a projection optical unit superior in the set developing efficiency.

It is preferable that the magnification of an enlarged image obtained by the first lens group 22 be 2 to 7 times although it differs depending on the effective picture plane size of the image display element used. In order to limit the distance from the first lens group to the imaging position within an optimum range and to set the profiles of the first and second lens groups within a producible range, it is more preferable that the magnification in question be set within the range of 2 to 5 times.

In the examples according to the present invention shown in FIGS. 5 and 6, the optical axis $2_1$ of the second lens barrel 2 is shifted onto XZ plane relative to the optical axis $3_1$ of the first lens barrel 3 and an appropriate quantity of this shift is selected. By so doing, for example as shown in FIG. 1, the shift quantity for the transmission type screen 6 can be changed arbitrarily. Therefore, the form of the set can be changed freely even at the same picture plane size and thus degree of design freedom is greatly improved.

Figure 3:
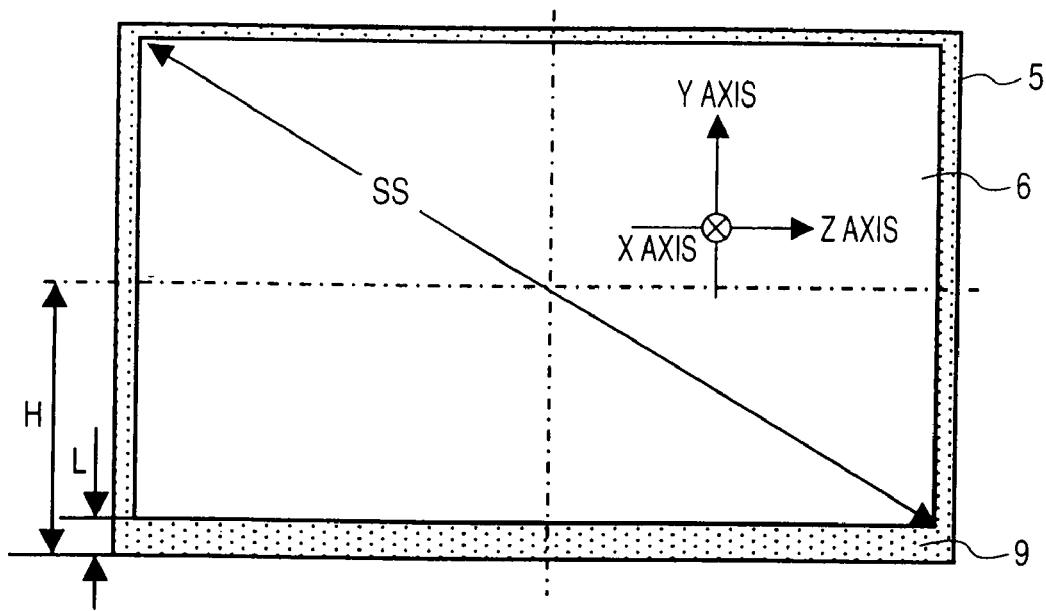
FIG. 3 is a front view of a rear projection type image display device embodying the present invention.

FIG. 3 is a front view of a rear projection type image display device using a projection optical system according to the present invention, showing the structural features thereof. In the same figure, numeral 5 denotes a housing (not shown), numeral 6 denotes a screen, and numeral 9 denotes a front frame. Further, the reference character SS denotes a screen size, L denotes the distance from a screen lower end (effective picture plane aperture) to a housing lower end, and H denotes the distance from a screen contour center (center of the effective picture plane aperture) to the housing lower end.

Figure 4:
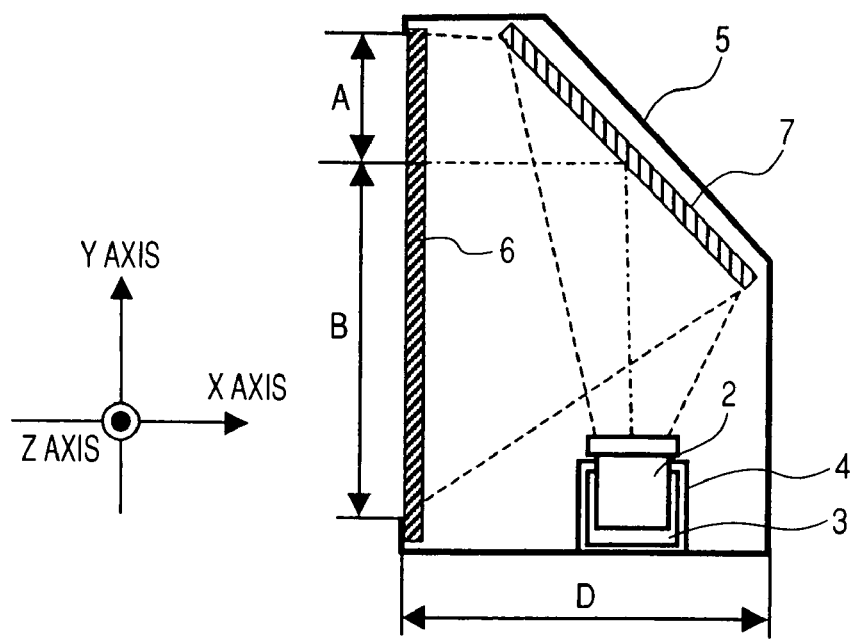
FIG. 4 is a side view thereof.

FIG. 4 is a side view thereof. In FIG. 4, the same components as in FIGS. 1 to 3 are identified by the same reference numerals as in FIGS. 1 to 3.

In FIG. 4, reference characters A and B stand for parameters which represent the ratio of shift (off-center) of image light incident on the screen 6, and D stands for the depth (inch) of the set.

Figure 7:
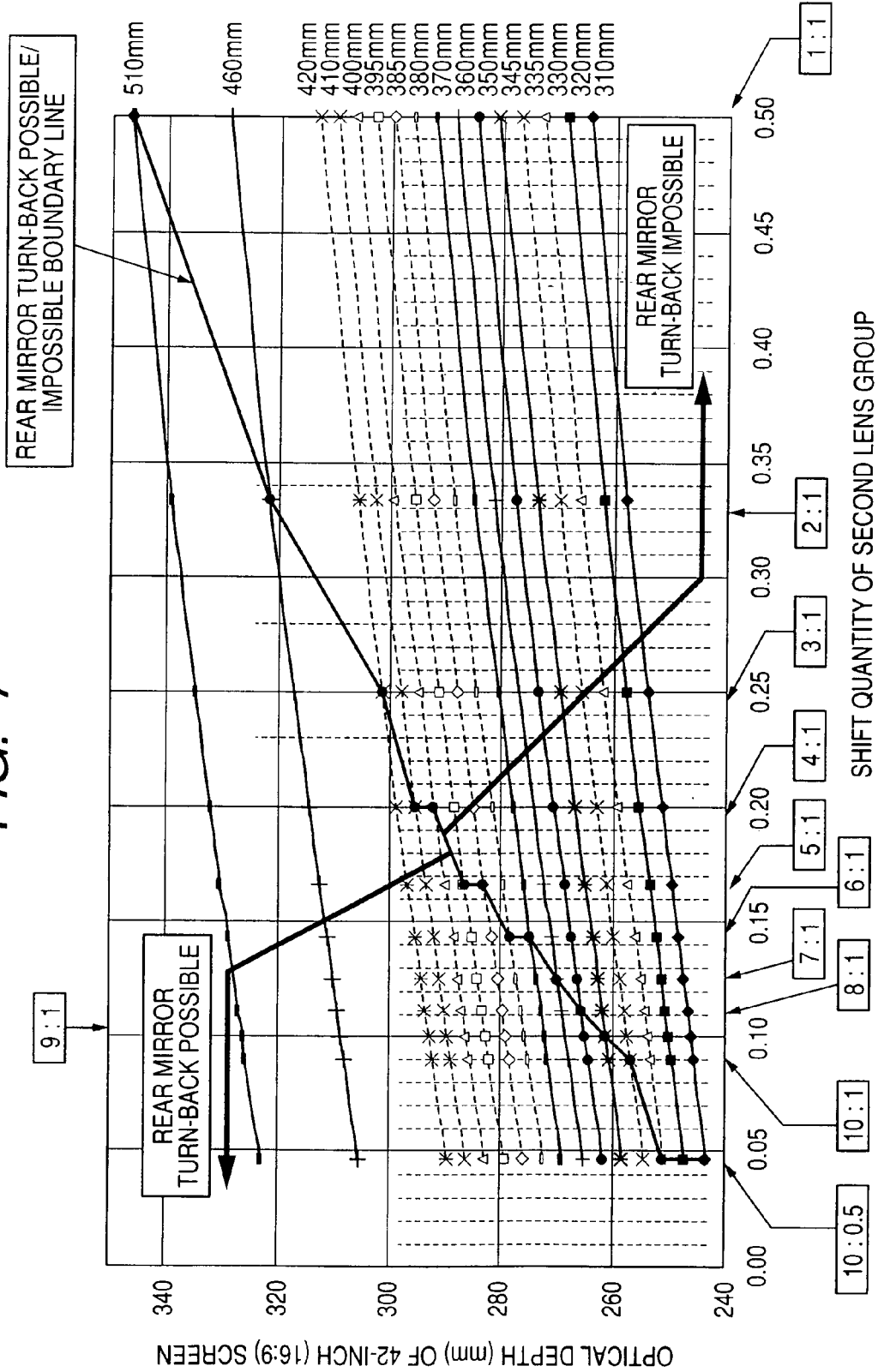
FIG. 7 is a first explanatory diagram showing the relationship between the depth of the rear projection type image display unit and, a shift quantity and a projection distance of a projection optical system.

A characteristic graph of FIG. 7 shows the result of calculation made by using the following first and second parameters in a case of using the projection optical system (projection optical unit) according to the present invention described above and in a case of setting the screen size SS at 42 inches. The distance from the screen-side lens face front end of the lens disposed at the closest position to the screen 6 up to the screen 6 (hereinafter referred to as "projection distance") is used as the first parameter and is changed in the range from 510 mm to 310 mm. Further, the optical axis $2_1$ of the second lens barrel 2 is shifted (off-centered) substantially in the positive direction of X axis (rightwards in FIG. 2) on XZ plane for example relative to the optical axis $3_1$ of the first lens barrel 3 and the shift quantity (off-center quantity) obtained is used as the second parameter. The first and second parameters were changed and the depth of the set obtained using a single optical path turn-back mirror was determined by calculation. The results obtained are shown in FIG. 7.

In FIG. 7, the axis of abscissa represents the shift quantity of the optical axis $2_1$ of the second lens barrel 2 relative to the optical axis $3_1$ of the first lens barrel 3. For example, a shift quantity (optical axis off-center quantity) of 0.5 as the second parameter indicates a state in which the optical axis $2_1$ of the second lens barrel 2 and the optical axis $3_1$ of the first lens barrel 3 are aligned with each other. In the set, therefore, as shown in FIG. 4, the optical axis of the projection optical unit and the center of Fresnel lens provided on at last one side of Fresnel sheet (not shown) of the transmission type screen 6 coincide with the profile center of the Fresnel sheet. That is, when the height of the Fresnel sheet is divided vertically with respect to the optical axis of the projection optical unit, a dividing ratio A:B becomes 1:1. As a result, the center of image light is outputted perpendicularly to the transmission type screen.

Likewise, a shift quantity of 0.25 indicates a state in which the optical axis $2_1$ of the second lens barrel 2 and the optical axis $3_1$ of the first lens barrel 3 are shifted at a ratio of 3:1 relative to 100% image height of the first lens group 22. In the set being considered, therefore, as shown in FIG. 4, when the height of the Fresnel sheet is divided vertically with respect to the optical axis of the projection lens, a dividing ratio A:B (A and B in the same figure) satisfies the relation of 3:1. By so shifting, the center of image light is outputted perpendicularly to the transmission type screen.

The axis of ordinate in FIG. 7 represents the distance (designated as an optical depth in FIG. 7) from the lower end of the optical path turn-back mirror 7 to the set housing front side shown in FIG. 4. An actual depth of the set is a value obtained by adding about 60 to 100 mm to this value taking tolerance and margin in structural design into account.

The above is a way of looking at the simulation results (FIG. 7) of realizable set dimensions in the case of setting the screen size at 42 inches and using the projection distance of the projection optical unit and optical axis shift quantity as parameters.

A central, oblique, solid line in FIG. 7 is a line obtained by joining limit points which enable the provision of the optical path turn-back mirror in the interior of the set housing without the optical unit and chassis member shielding the image light. More particularly, the solid line in question is a line obtained by joining values corresponding to the above limit points in a case of changing the projection distance of the projection optical unit as the first parameter and the shift quantity of the optical axis $2_1$ of the second lens barrel 2 as the second parameter.

In order to give priority to the design property of the set, the distance L from the lower end of the screen to the lower end of the set housing should be made as short as possible as shown in FIG. 3 and an apparent area occupied by the screen as seen from the front side of the set should be made large. To meet this requirement, optimizing the shift quantity of the optical axis $2_1$ of the second lens barrel 2 is most effective.

According to the knowledge obtained by repeated trial manufacture of set models, firstly, at a screen size SS of 42 inches and an aspect ratio of 16:9, there is obtained a set appearance superior in design property if the distance L is 110 mm or less. At this time, the shift quantity of the optical axis $2_1$ of the second lens barrel 2 is 4:1 or less, and the value of L can be made 90 mm or less if the shift quantity is set at 6:1 or less. As a result, an apparent area occupied by the screen relative to the entire set can be made still smaller, providing a set appearance superior in design property.

At this time (when the shift quantity is set at 6:1 and the value of L is set at 90 mm or less), the distance H from the center of the screen profile to the lower end of the set housing was 350 mm in the case of a set having a screen size SS of 42 inches and an aspect ratio of 16:9. In this case, a required projection distance of the projection optical unit is 380 mm. In addition, the set depth is about 380 mm (42 inches) obtained by adding about 100 mm, taking tolerance and margin in structural design into account, to 278 mm as a value of simulation result of an optical depth.

Figure 8:
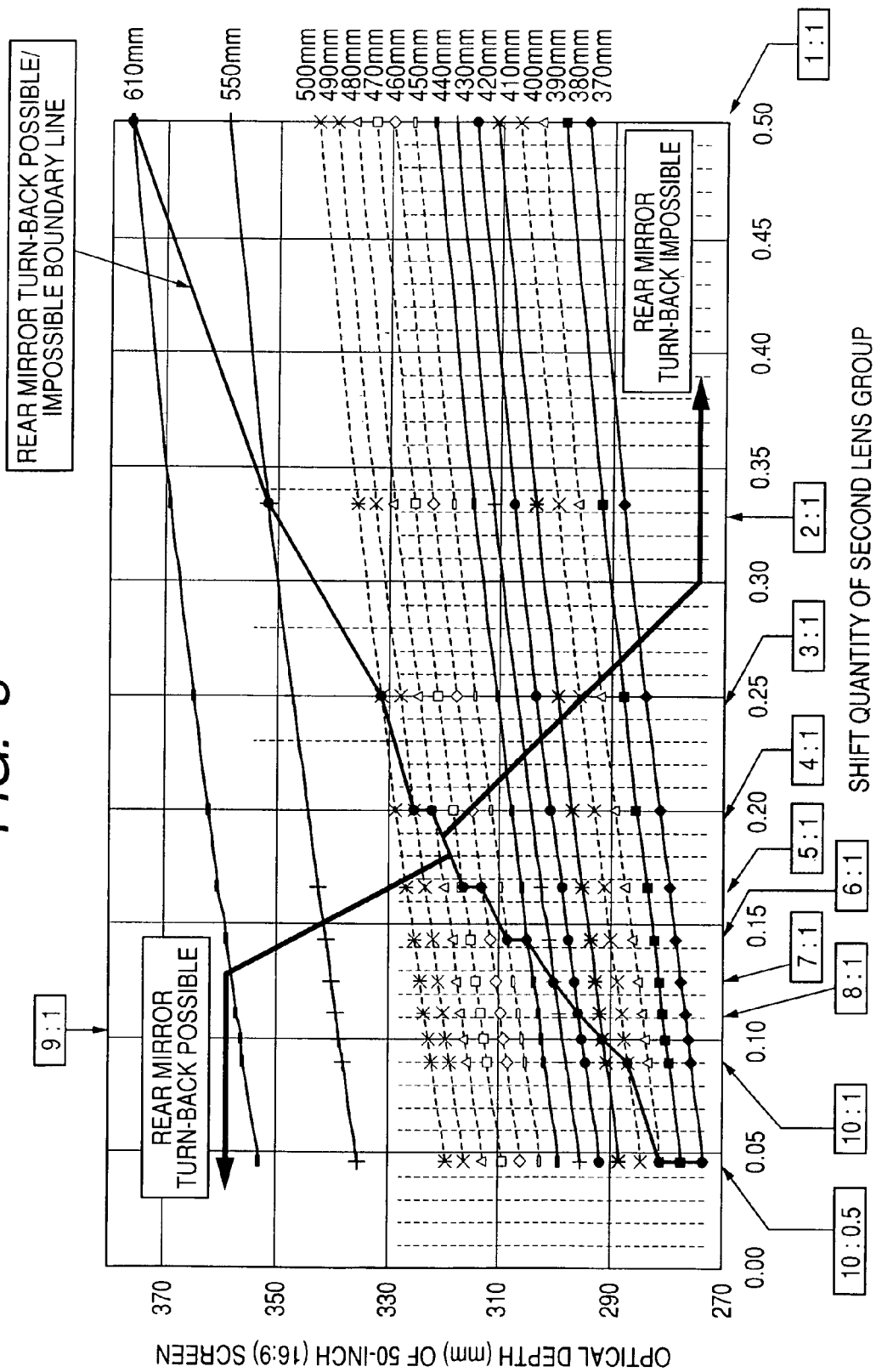
FIG. 8 is a second explanatory diagram showing the relationship between the depth of the rear projection type image display unit and, a shift quantity and a projection distance of the projection optical system.

Secondly, FIG. 8 shows simulation results obtained in a set having a screen size SS of 50 inches and an aspect ratio of 16:9. In the case of the L shown in FIG. 3 being 130 mm or less, there was obtained a set appearance superior in design property. At this time, the shift quantity of the optical axis $2_1$ of the second lens barrel 2 is 4:1 or less, and the value of L can be made 110 mm or less if the shift quantity is set at 6:1 or less. Thus, an apparent area occupied by the screen relative to the entire set can be made still smaller, providing a set appearance superior in design property.

At this time (when the shift quantity was set at 6:1 and the value of L at 110 mm or less), the distance H from the screen profile center to the lower end of the set housing was 420 mm in the case of a set having a screen size SS of 50 inches and an aspect ratio of 16:9. The projection distance of the projection optical unit at this time is 460 mm. In addition, the set depth is 410 mm (50 inches) obtained by adding about 100 mm, taking tolerance and margin in structural design into account, to 398 mm as a simulation result.

Figure 9:
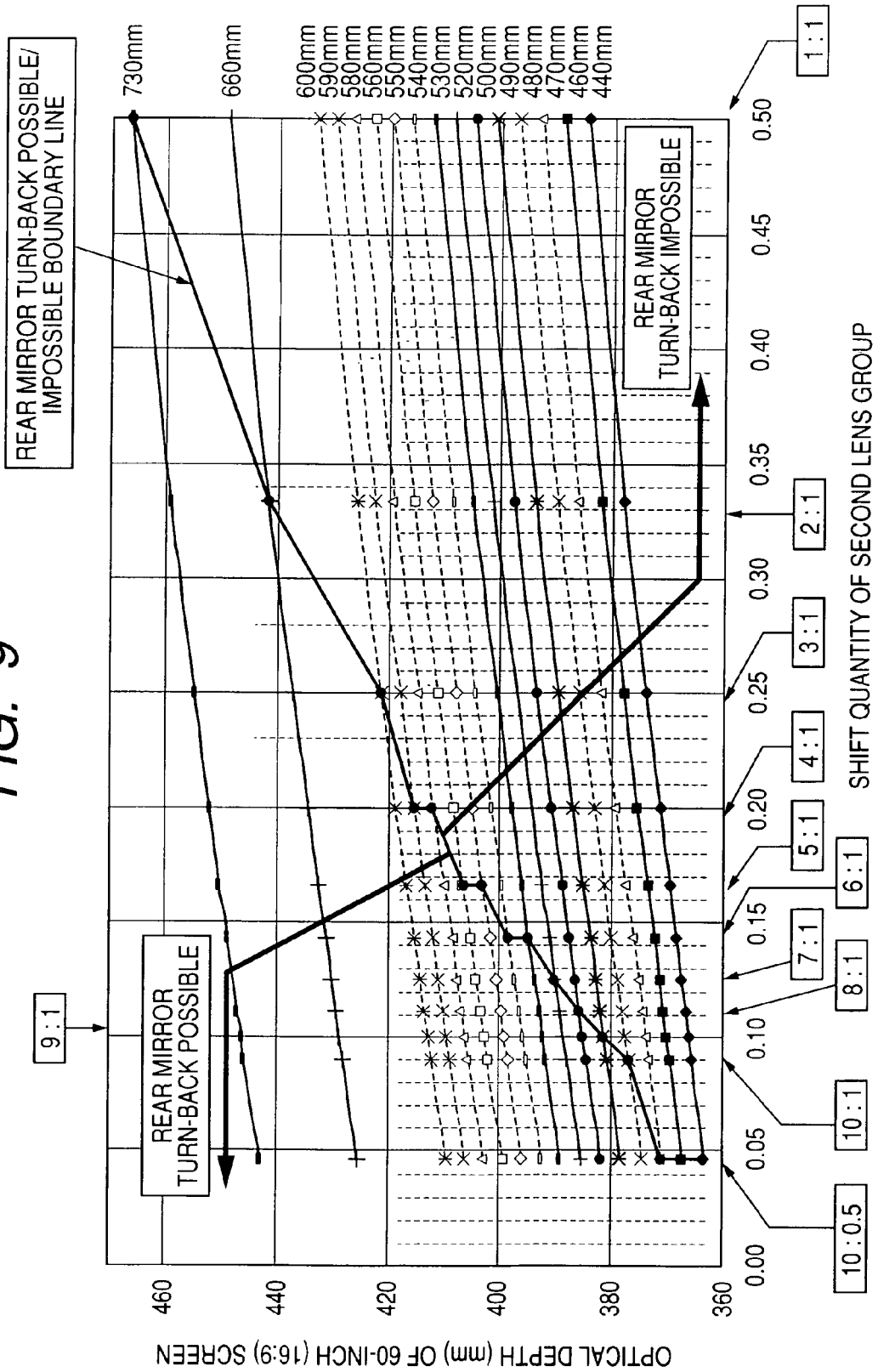
FIG. 9 is a third explanatory diagram showing the relationship between the depth of the rear projection type image display unit and, a shift quantity and a projection distance of the projection optical system.

Thirdly, FIG. 9 shows simulation results obtained in a set having a screen size SS of 60 inches and an aspect ratio of 16:9. When the L shown in FIG. 3 was 160 mm or less, there was obtained a set appearance superior in design property. In this case, the shift quantity of the optical axis $2_1$ of the second lens barrel 2 is 4:1 or less, and the value of L can be made 140 mm or less if the shift quantity is adjusted to 6:1 or less. As a result, there is obtained a set appearance having a still smaller apparent area occupied by the screen relative to the entire set and being superior in design property.

At this time (when the shift quantity was set at 6:1 and the value of L at 140 mm or less), the distance H from the screen profile center to the lower end of the set housing was 515 mm in the case of a set having a screen size SS of 60 inches and an aspect ratio of 16:9. The projection distance of the projection optical unit at this time was 540 mm. In addition, the set depth is 500 mm (60 inches) obtained by adding about 100 mm, taking tolerance and margin in structural design into account, to 398 mm as a simulation result of the optical depth.

The above simulation results are summarized in Table 1 below.

TABLE 1

| Screen Size SS (inch) | Depth of Set D (inch) | Spacing L (inch) | Central Height H (inch) | Projection Distance LL (inch) |
|---|---|---|---|---|
| 42 | 14.96 | 3.5 | 13.8 | 15.0 |
| 50 | 16.14 | 4.3 | 16.5 | 18.1 |
| 60 | 19.69 | 5.5 | 20.3 | 21.3 |

Figure 10:
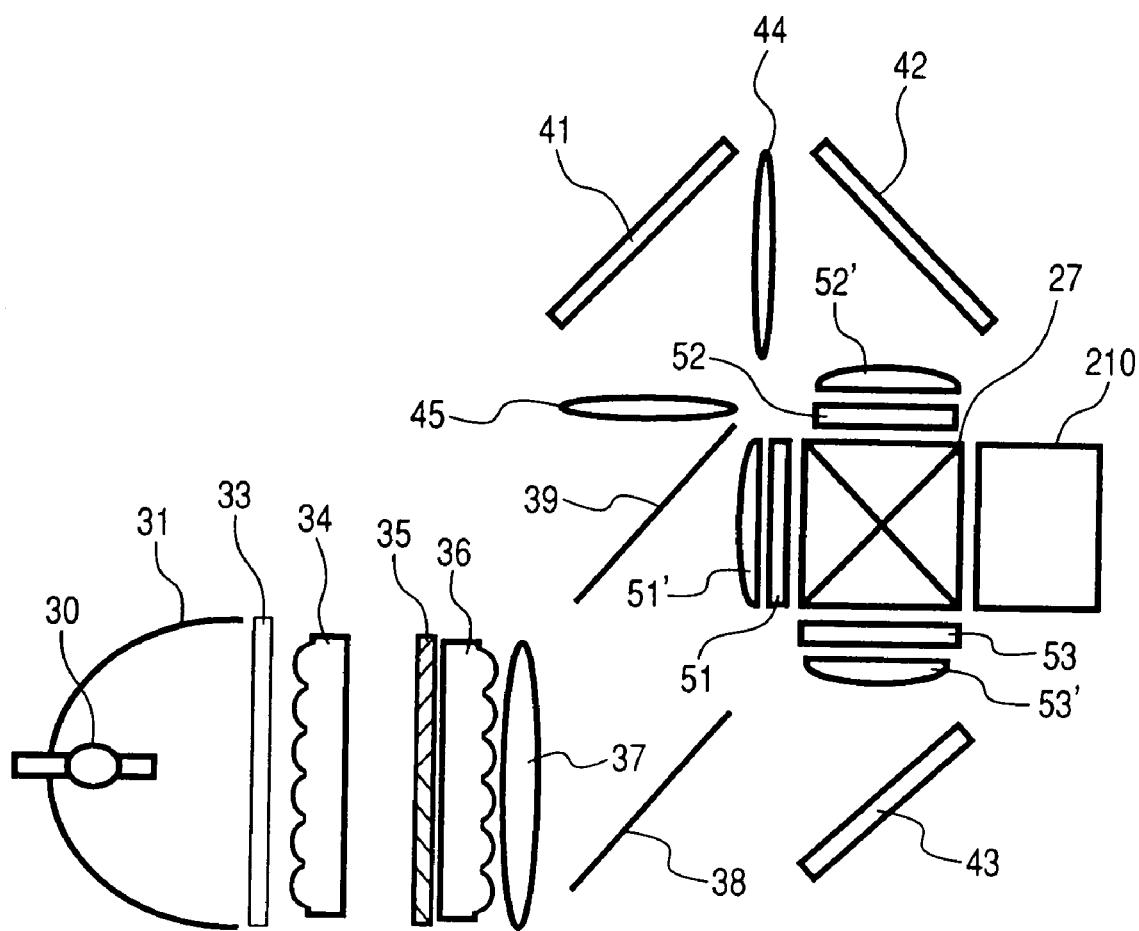
FIG. 10 is a layout diagram showing an illumination optical system used in the rear projection type image display device embodying the invention.

FIG. 10 is a layout diagram showing an illumination optical system in a case of using a transmission type liquid crystal panel as an image display element in the rear projection type image display device according to the first embodiment of the invention.

In FIG. 10, a white beam of light emitted from a lamp bulb 30 as a white light source is reflected by a reflector 31 and passes as a desired light beam through an explosion-proof glass 33. This light beam is divided by a fly-eye lens 34 and is monopolarized by a polarization beam splitter 35. The split light beam which has thus become a single polarized light is projected on a larger scale and superimposed on the liquid crystal panels (G) 51, (B) 52 and (R) 53 by a fly-eye lens 36 and a field lens 37 which are disposed in positions opposed to each other. Consequently, the distribution of energy of the light beam incident on the panels is rendered uniform. The white light beam is separated into a red light beam and a cyan light beam by a dichroic mirror 38 disposed on the optical path. The chromaticity of the red image light improves the color purity in accordance with a spectral reflection characteristic of the dichroic mirror 38 and that of a trimming filter provided on a lens 53'.

A dichroic mirror 39 possesses a characteristic of reflecting light of the green region. As is the case with red color, a trimming filter is provided on a lens 51'. The remaining blue light beam is split, for example, by a mirror 41, a mirror 42, or in accordance with the characteristic of a dichroic mirror provided on a lens 52'. A short wavelength side is cut off by the fly-eye lens provided with a UV cut-off filter and a lens 44.

The above is an explanation of a color separating section in the illumination optical system according to the present invention in the case of using transmission type liquid crystal panels as image display elements. The color light beams thus separated into red, green and blow beams by the above technical means enter the respective corresponding transmission type liquid crystal panels 53, 51 and 52 and output beam quantities (light quantities) are modulated in accordance with the amplitude of the video signal. The color light beams thus modulated are synthesized by the crossed prisms 27 and projected on a larger scale on the screen by the projection optical unit 210.

The illumination optical system according to the present invention has been described above with respect to the case where transmission type liquid crystal panels are used. Even in a case of using reflection type liquid crystal panels as image display elements, it goes without saying that the projection optical unit according to the present invention is applicable after image synthesis. That is, the present invention is applicable also to a set using reflection type liquid crystal panels.

As described above, the projection optical unit according to the present invention comprises at least two lens groups. It is optional whether the field lens (or lens group) is to be positioned on the second lens group side or on the first lens group side with respect to the optical path turn-back means, and thus the degree of layout freedom is high. However, if the field lens (or lens group) is disposed on the second lens group side with respect to the optical path turn-back means, the individual lens (or lenses) which constitutes the field lens (or lens group) and the second lens group become larger in apertures thus leading to an increase in cost. Moreover, since the lens surface of the field lens group is close to the imaging surface of the first lens group, the quality of the enlarged image on the screen may be impaired eventually in the event of adhesion of dust to the lens surface of the field lens (or lens group). In such a case, therefore, care must be exercised in the stage of design.

Further, as described above, the projection optical unit according to the present invention comprises at least two lens groups, and the crossed prisms 27 for color synthesis is present between the transmission type liquid crystal panels as image display elements and the first lens group 22, as shown in FIGS. 5 and 6. Therefore, the first lens group inevitably becomes a retrofocus type. Besides, since the light beams in the illumination optical system are nearly parallel to each other, the optical system is a telecentric optical system, and the enlarged image from the first lens group 22 is formed near the field lens (or lens group) 23.

Figure 12:
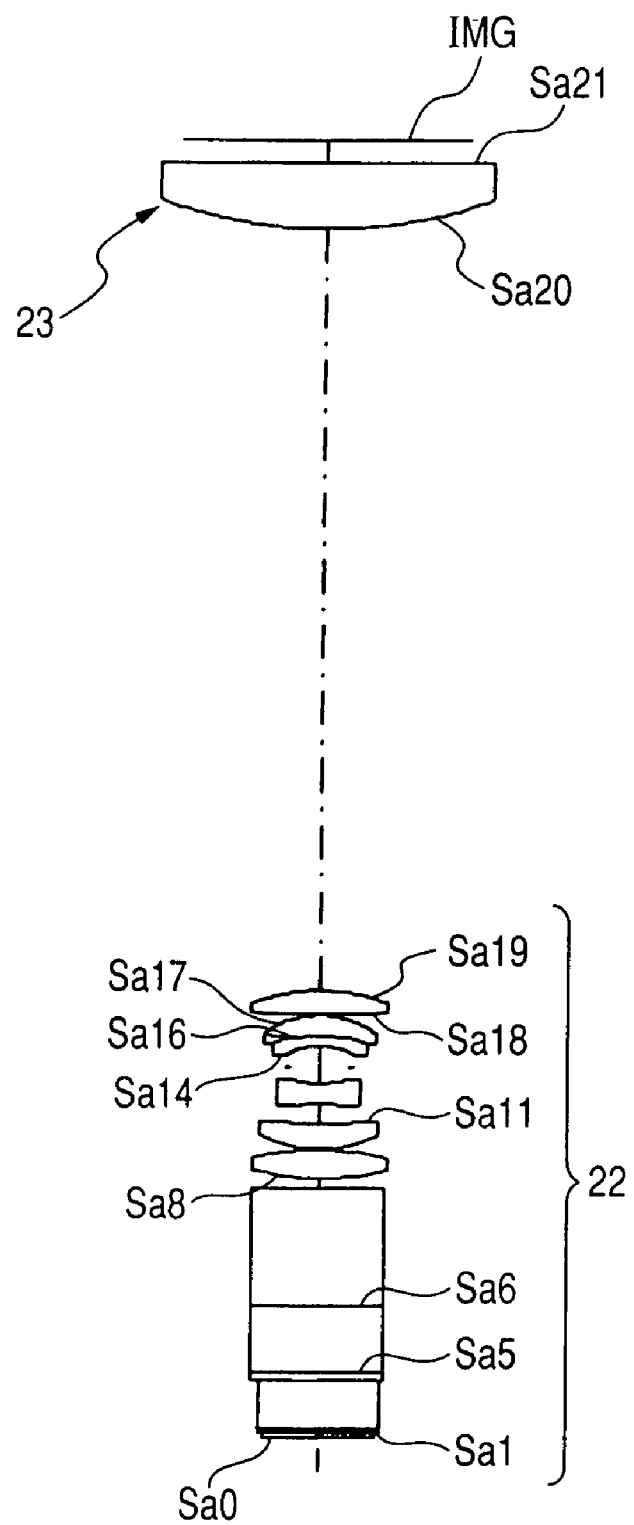
FIG. 12 is a diagram showing a layout of the first lens group in the first example of the projection optical system.

In connection with an example of the projection optical unit according to the present invention, lens data and lens construction of the first lens group 22 are shown in FIGS. 11 and 12, respectively. The reference numerals assigned to the lenses in FIG. 12 agree with the reference numerals assigned to lens surfaces in FIG. 11. In FIG. 11, surfaces Sa6 and Sa7 are of the crossed prisms 27 (FIGS. 5 and 6), surfaces Sa8 to Sa18 are of the first lens group 22, surfaces Sa20 and Sa21 are of the field lens 23, and surface Sa21 corresponds to a first imaging position, which is indicated at IMG in FIG. 12.

Figure 13:
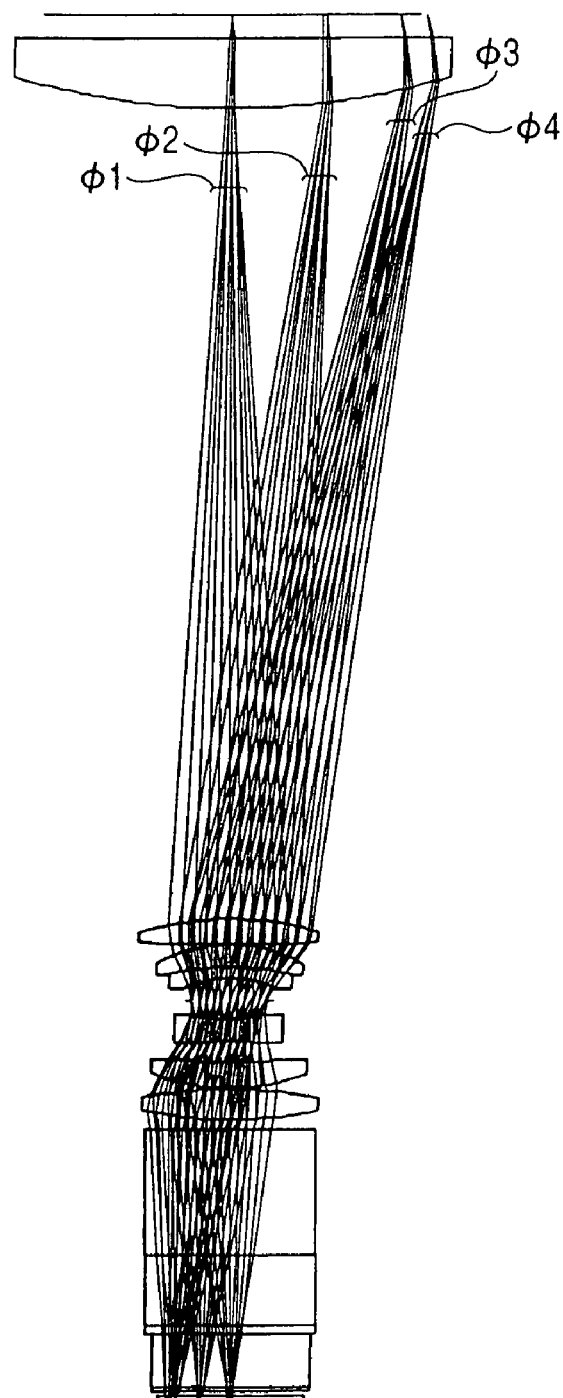
FIG. 13 is a diagram showing the result of having traced light rays for the first lens group in the first example of the projection optical system.

FIG. 13 shows the results of having traced a light beam $\phi 1$ which focuses on the optical axis, a light beam $\phi 2$ which focuses in a medium region of the screen, and light beams $\phi 3$ and $\phi 4$ which focus at peripheral positions of the screen.

Figure 14:
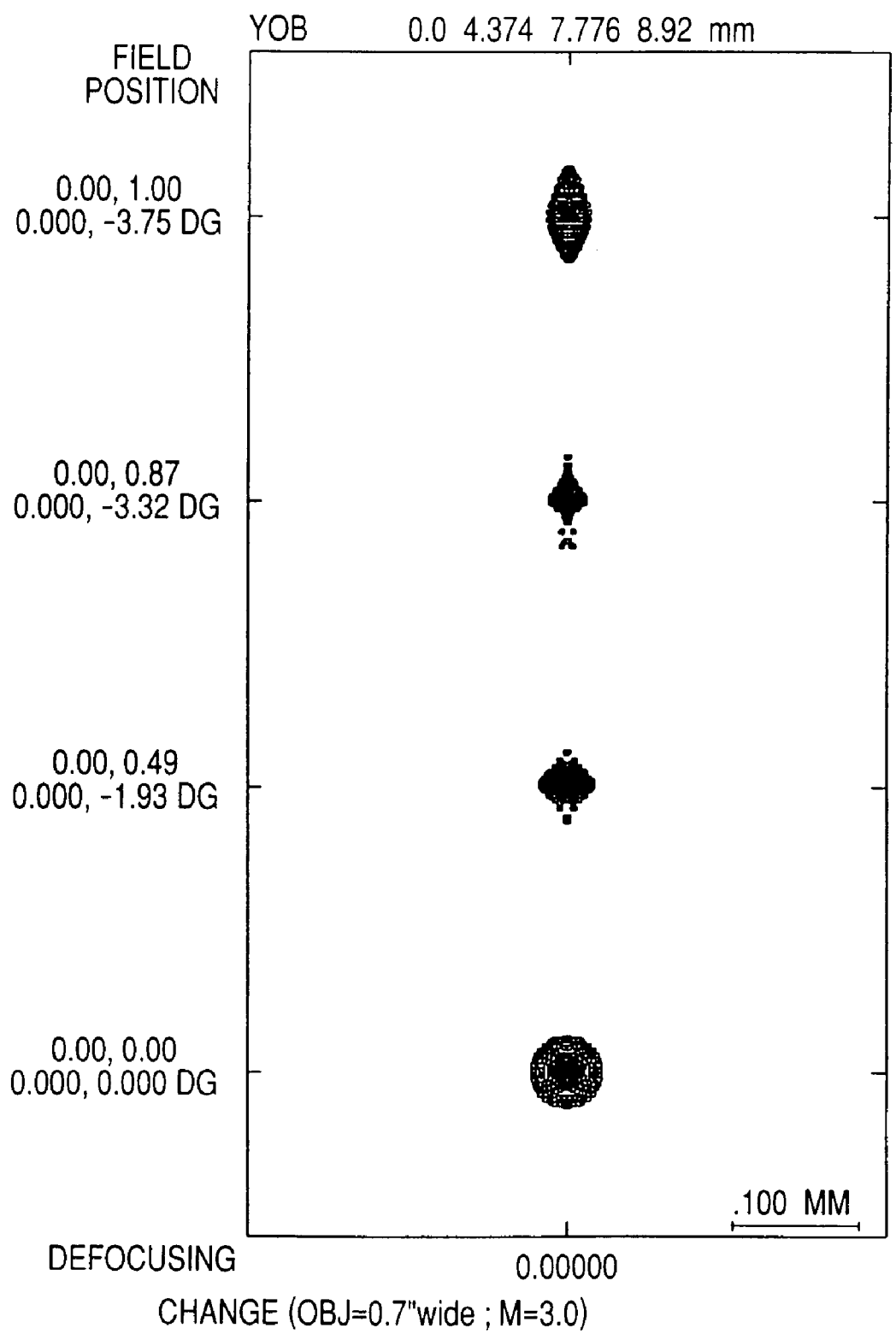
FIG. 14 is a characteristic diagram showing spot shapes on an imaging surface formed by the first lens group in the first example of the projection optical system.

FIG. 14 is for showing imaging performance by the first lens group referred to in the first example of the projection optical unit according to the present invention. Specifically, FIG. 14 is a spot diagram on the imaging surface (IMG) formed in the case of setting an object surface size or panel size at 0.7 inch and an aspect ratio at 16:9. A blue light beam having a wavelength of 450 nm, a green light beam having a wavelength of 545 nm and a red light beam having a wavelength of 625 nm are superimposed one on another and evaluation is made in this state. From the convergence to about 50 µm in spot size it is seen that a satisfactory performance is obtained.

Figure 16:
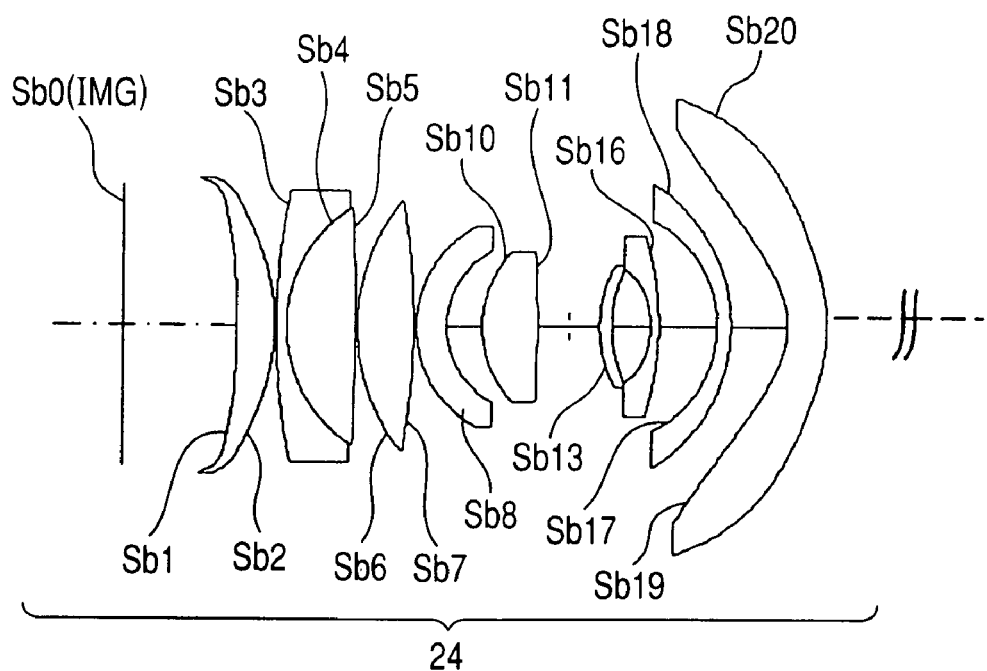
FIG. 16 is a diagram showing a layout of the second lens group in the first example of the projection optical system.

Next, in connection with an example of a projection optical unit of an ultra-wide angle according to the present invention, lens data and lens construction of the second lens group 24 are shown in FIGS. 15 and 16, respectively. The reference numerals assigned to the lenses in FIG. 16 agree with the reference numerals assigned to lens surfaces in FIG. 15. In FIG. 16, Sb0 surface serves not only as the imaging surface (IMG) of the first lens group but also as an object surface of the second lens group 24.

The second lens group 24 is provided with lens surfaces of Sb1 to Sb20. An aspheric expression and coefficients which represent the said lens surfaces are described in FIG. 15. Of the lens surfaces Sb1 to Sb20, aspheric lens surfaces are six, which are Sb1, Sb2, Sb15, Sb16, Sb19 and Sb20. Thus, the second lens group includes at least three aspheric lenses. Usually, the F value of the first lens group is determined to match the F value of the illumination optical system, but the F value of the first lens group in the example being considered is 3.0. Since the projection magnification is three times, it is possible to introduce a sufficient quantity of light beam even if the F value of the second lens group is 9.0. Besides, since the F value of the second lens group can be made as large as 9.0, the spacing (projection distance) from the final surface (Sb20 surface) in 50-inch projection to the screen surface is 425 mm and the field angle is 113°. Thus, it is possible to provide a projection optical unit of an ultra-wide angle.

Figure 17:
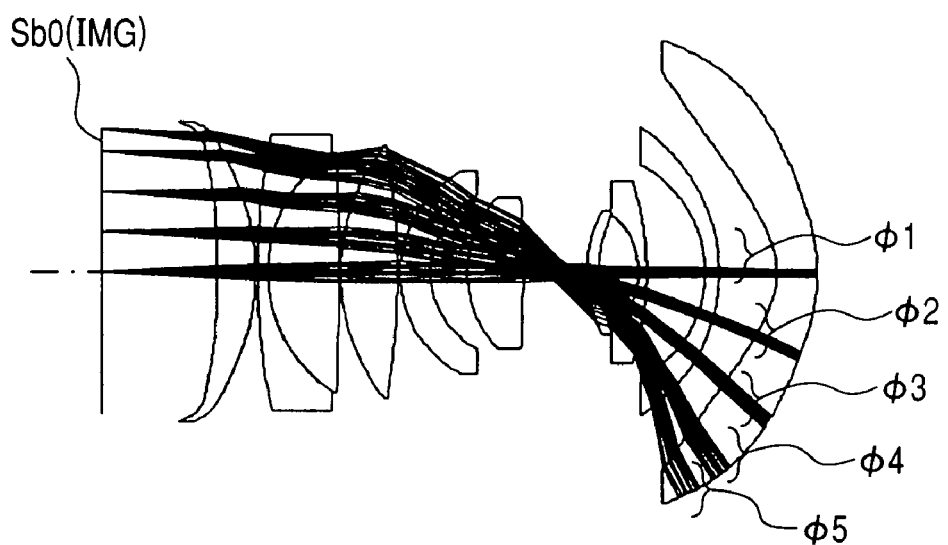
FIG. 17 is a diagram showing the result of having traced light rays for the second lens group in the first example of the projection optical system.

FIG. 17 shows the results of having traced a light beam $\phi 1$ which focuses on the optical axis, light beams $\phi 2$ and $\phi 3$ which focus in a medium region of the screen and light beams $\phi 4$ and $\phi 5$ which focus at peripheral positions of the screen.

Figure 18:
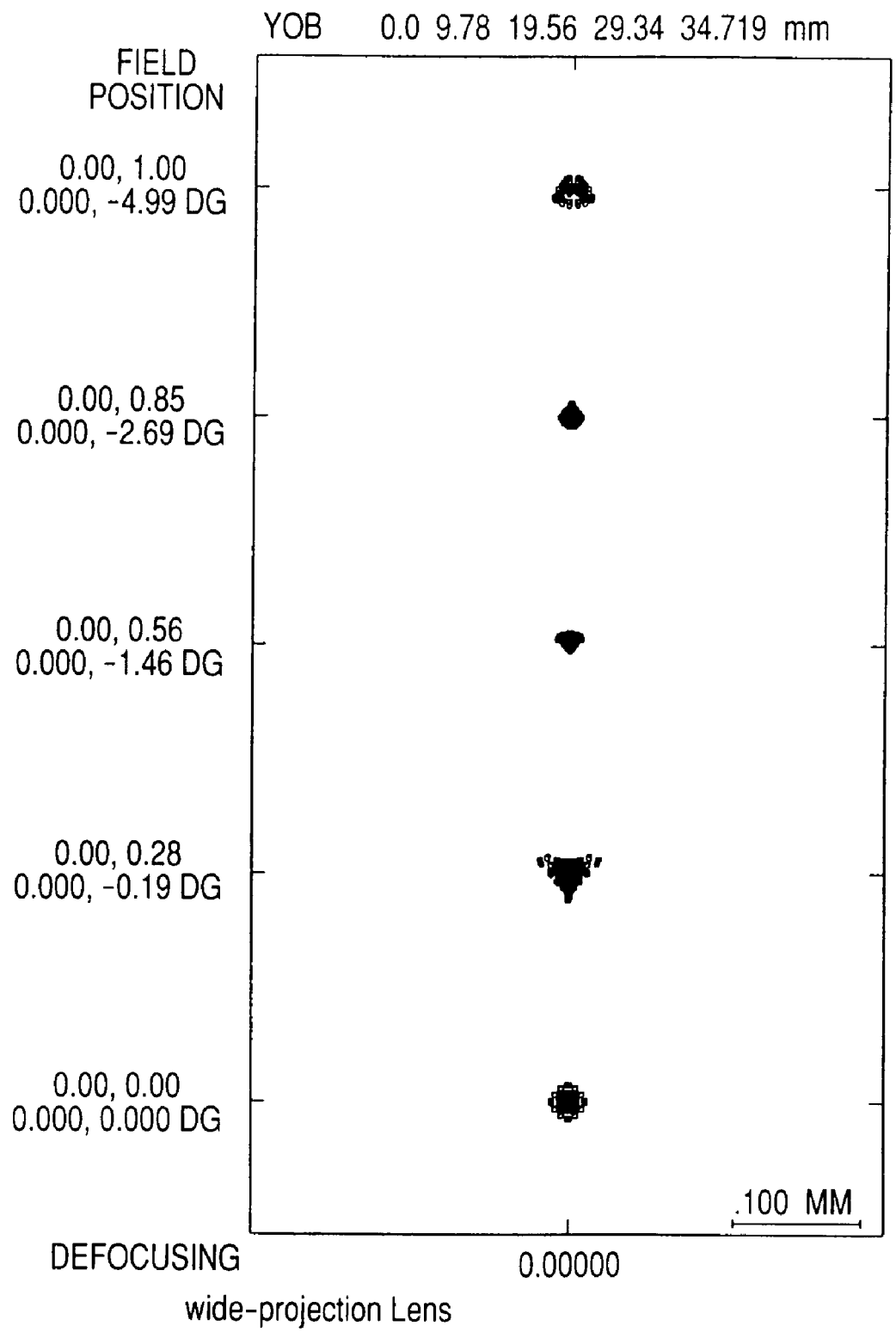
FIG. 18 is a characteristic diagram showing spot shapes on an imaging surface formed by the second lens group in the first example of the projection optical system.

FIG. 18 is for showing imaging performance by the second lens group 24 referred to in the first example of the projection optical unit according to the present invention. FIG. 18 is a spot diagram on the screen surface formed in the case of setting an object surface size at 2.1 inches, that is, making the object surface large, an aspect ratio of 16:9 and a shift quantity at 7:1. A blue light beam having a wavelength of 450 nm, a green light beam having a wavelength of 545 nm and a red light beam having a wavelength of 625 nm are superimposed one on another and evaluation is made in this state. From the convergence to about 30 µm in spot size it is seen that a satisfactory performance is obtained.

Figure 19:
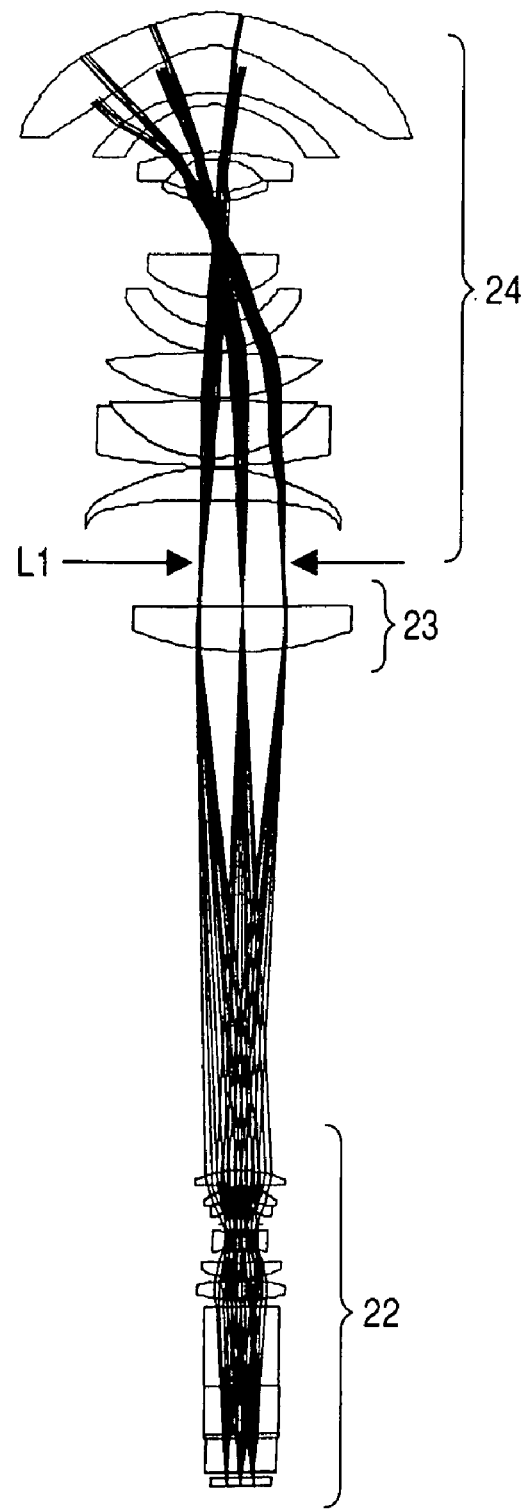
FIG. 19 is a diagram showing the result of having traced light rays in the first example of the projection optical system.
Figure 20:
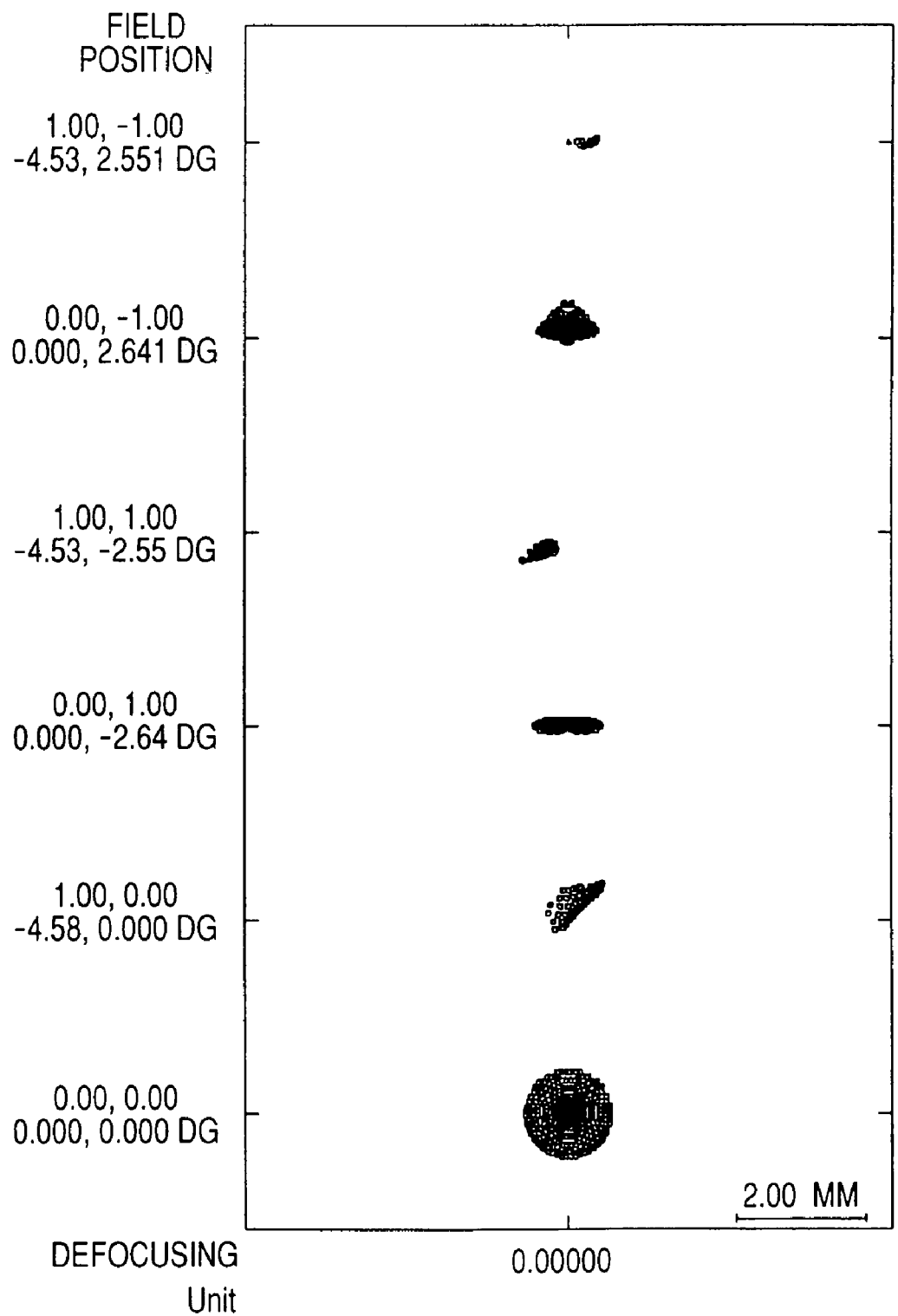
FIG. 20 is a characteristic diagram showing spot shapes on an imaging surface formed by the first example of the projection optical system.

FIG. 19 shows the results of having traced light beams under the condition where the optical axis of the second lens group 24 and that of the first lens group 22 and field lens 23 in the projection optical unit according to the present invention are shifted (off-centered) at a shift quantity of L1 (7:1 relative to a short side with an aspect ratio of 16:9). FIG. 20 is a spot diagram on the screen surface formed in the case of setting the object surface size, or panel size, and an aspect ratio in the first lens group of the projection optical unit according to the present invention at 0.7 inch and 16:9, respectively, and the object surface size (image surface of the first lens group) and an aspect ratio in the second lens group at 2.1 inches and 16:9, respectively. A blue light beam having a wavelength of 450 nm, a green light beam having a wavelength of 545 nm and a red light beam having a wavelength of 625 nm are superimposed one on another and evaluation is made in this state. From the convergence to about 1.8 mm in spot size it is seen that a satisfactory performance is obtained.

In the rear projection type image display device adopting the projection optical unit according to the present invention, a sufficient magnification is ensured even if the distance up to the reflection screen is short and hence it is possible to enjoy a picture having a strong impact. Further, by applying the projection optical unit according to the present invention to the rear projection type image display device, it is possible to provide such a compact set as has heretofore been unavailable even if the number of the optical path turn-back mirror is only one and even if the spacing from the lower end of the screen to the lower end of the set housing is narrow.

It goes without saying that the application of the projection optical unit is not limited to the rear projection type image display device, but is applicable also to a front projection type image display device in which an image is projected from the front side of the screen.

With the projection optical unit according to the present invention, as described above, both ultra-wide angle and high focusing required for a compact construction of the set can be attained even if the magnification is made high. Besides, even if the effective picture plane size of the image display element used changes, it is possible to cope with the change by modifying the projection optical unit. Therefore, in an image display device or a rear projection type image display device adopting the projection optical unit, it is possible to reduce the cost for development of a different size of a set and model as a result of a change of an effective display area in the image display element. Thus, there accrues such a great merit as has heretofore been unobtainable.

What is claimed is:

1. A rear projection type image display device comprising:

an illumination optical system for irradiating an image display element with a light from a light source; and a projection optical system for projecting an image on the image display element onto a screen;

wherein:

the illumination optical system includes a first fly-eye lens dividing a light emitted from the light source, a polarization beam splitter monopolarizing the light beam divided by the first fly-eye lens, a second fly-eye lens irradiated with a light beam monopolarized by the polarization beam splitter, a field lens irradiating the image display element with a light beam output from the second fly-eye lens, a first dichroic mirror separating the light beam irradiated from the field lens into a red light beam and a cyan light beam, a first image display element irradiated with the red light beam separated by the first dichoric mirror and a first lens providing a trimming filter with a spectral reflection characteristic, the first lens being disposed in an optical path from the first dichroic mirror to the first image display element, and the projection optical system includes first and second lens groups disposed in this order in an optical path from the image display element to the screen so as to obtain enlarged images twice or more, the first lens group positioned closest to the image display element being in a substantially telecentric relation to the image display element side, the first lens group forming a first enlarged image on the image display element side with respect to the second lens group and the second lens group having a positive refracting power and a filed angle of not smaller than 90 degrees.

2. A rear projection type image display device according to claim 1, wherein the illumination optical system includes a second dichroic mirror possessing a characteristic of reflecting light of green region, a second image display element irradiated with the green light beam reflected by the second dichroic mirror and a second lens providing a trimming filter with a spectral reflection characteristic, the second dichroic mirror being disposed in an optical path of the cyan light beam separated by the first dichroic mirror and the second lens being disposed in an optical path from the second dichroic mirror to the second image display element.

3. A rear projection type image display device according to claim 2, wherein the illumination optical system includes a first reflecting mirror reflecting a blue light beam transmitted by the second dichroic mirror, a third lens irradiated with the blue light beam reflected by the first reflecting mirror, a second reflecting mirror reflecting the blue light beam irradiated from the third lens, a fourth lens irradiated with the blue light beam reflected by the second reflecting mirror and a third image display element irradiated with the blue light beam from the fourth lens, the first fly-eye lens and the third lens providing a UV cut-off filter and at least one of the first reflecting mirror, the second reflecting mirror and the fourth lens providing a characteristic of a dichoric mirror.

* * * * *